United States Patent
Modave et al.

(10) Patent No.: US 9,313,027 B2
(45) Date of Patent: Apr. 12, 2016

(54) PROTECTION OF A CALCULATION PERFORMED BY AN INTEGRATED CIRCUIT

(75) Inventors: Jean-Louis Modave, Ottignies (BE); Thierry Huque, Moxhe (BE)

(73) Assignee: Proton World International N.V., Zaventem (BE)

( * ) Notice: Subject to any disclaimer, the term of this patent is extended or adjusted under 35 U.S.C. 154(b) by 1891 days.

(21) Appl. No.: 11/647,002

(22) Filed: Dec. 28, 2006

(65) Prior Publication Data

US 2007/0156797 A1    Jul. 5, 2007

(30) Foreign Application Priority Data

Dec. 29, 2005    (FR) .................................. 05 54133

(51) Int. Cl.
| | |
|---|---|
| *H04L 9/28* | (2006.01) |
| *G06F 7/72* | (2006.01) |
| *G09C 1/00* | (2006.01) |
| *H04L 9/00* | (2006.01) |
| *H04L 9/30* | (2006.01) |

(52) U.S. Cl.
CPC .................. *H04L 9/28* (2013.01); *G06F 7/723* (2013.01); *G09C 1/00* (2013.01); *H04L 9/004* (2013.01); *G06F 7/725* (2013.01); *G06F 2207/7261* (2013.01); *H04L 9/302* (2013.01); *H04L 9/3066* (2013.01); *H04L 2209/12* (2013.01)

(58) Field of Classification Search
CPC ....................................................... H04L 9/28
USPC .............................................................. 380/1
See application file for complete search history.

(56) References Cited

U.S. PATENT DOCUMENTS

| | | | | |
|---|---|---|---|---|
| 4,228,424 | A * | 10/1980 | Le Nay ................. | G08B 25/00 340/506 |
| 4,525,599 | A * | 6/1985 | Curran ................. | G06F 12/1408 273/460 |
| 4,582,324 | A * | 4/1986 | Koza ..................... | A63F 13/12 463/16 |
| 4,635,223 | A * | 1/1987 | Boone ................... | G06F 11/165 380/2 |
| 4,649,510 | A * | 3/1987 | Schmidt ................ | G06F 21/123 705/55 |
| 4,652,998 | A * | 3/1987 | Koza ..................... | G06Q 50/34 273/274 |
| RE32,468 | E * | 8/1987 | Le Nay ................. | G08B 25/00 340/505 |
| 4,862,156 | A * | 8/1989 | Westberg .............. | G09G 5/42 345/418 |
| 4,914,696 | A * | 4/1990 | Dudczak ............... | H04K 1/04 380/262 |
| 5,027,397 | A * | 6/1991 | Double ................. | G06F 21/87 713/194 |

(Continued)

FOREIGN PATENT DOCUMENTS

| | | |
|---|---|---|
| WO | WO 99/67909 A2 | 12/1999 |
| WO | 00/25204 A1 | 5/2000 |
| WO | WO 02/099624 A1 | 12/2002 |

OTHER PUBLICATIONS

U.S. Appl. No. 11/647,114, filed Dec. 2006, Huque et al.*

(Continued)

*Primary Examiner* — Bradley Holder
(74) *Attorney, Agent, or Firm* — Seed IP Law Group PLLC (57) ABSTRACT

The calculation, by an electronic circuit, of a result of an integral number of applications of an internal composition law on elements of an abelian group, by successive iterations of different steps according to the even or odd character of a current coefficient of a polynomial representation of said integer, the degree of which determines the number of iterations, each iteration including whatever the even or odd character of the current coefficient, updating of at least one variable conditioning the final calculation result.

16 Claims, 7 Drawing Sheets

(56) References Cited

U.S. PATENT DOCUMENTS

| | | | | |
|---|---|---|---|---|
| 5,058,164 | A | * | 10/1991 | Elmer ............... G06F 12/1408 380/277 |
| 5,159,629 | A | * | 10/1992 | Double ............... G06F 21/87 206/807 |
| 5,377,264 | A | * | 12/1994 | Lee .................. G06F 12/1433 340/5.74 |
| 5,384,847 | A | * | 1/1995 | Hendrickson ......... G07F 7/1016 380/247 |
| 6,246,970 | B1 | | 6/2001 | Silverbrook et al. |
| 6,298,135 | B1 | * | 10/2001 | Messerges et al. ............... 380/1 |
| 7,000,111 | B1 | * | 2/2006 | Dent et al. ................... 713/174 |
| 2004/0215685 | A1 | | 10/2004 | Seifert et al. |
| 2004/0267859 | A1 | * | 12/2004 | Fischer et al. ............... 708/606 |
| 2005/0235179 | A1 | * | 10/2005 | Pistoulet ..................... 714/724 |
| 2005/0243998 | A1 | | 11/2005 | Plessier |
| 2006/0133603 | A1 | | 6/2006 | Joye et al. |
| 2007/0162534 | A1 | | 7/2007 | Liardet et al. |
| 2008/0021941 | A1 | | 1/2008 | Huque et al. |

OTHER PUBLICATIONS

Rakers et al.; Secure contactless smartcard ASIC with DPA protection; Published in: Solid-State Circuits, IEEE Journal of (vol. 36, Issue: 3 ); pp. 559-565; Date of Publication Mar. 2001; IEEE Xplore.*

Ohkubo et al.; RFID privacy issues and technical challenges; Published in: Magazine Communications of the ACM—Special issue: RFID CACM Homepage archive; vol. 48 Issue 9, Sep. 2005; pp. 66-71; ACM Digital Library.*

French Search Report from French Patent Application 05/54134, filed Dec. 29, 2005.

French Search Report from French Patent Application 05/54133, filed Dec. 29, 2005.

Certicom Research, "SEC 1: Elliptic Curve Cryptography," Standards for Efficient Cryptography, Version 1.0, Sep. 20, 2000, 98 pages.

ISO/IEC 15946-2, "Information technology—Security techniques—Cryptographic techniques based on elliptic curves—Part 2: Digital signatures," International Standard, First Edition, Dec. 1, 2002, 37 pages.

ISO/IEC 15946-3, "Information technology—Security techniques—Cryptographic techniques based on elliptic curves—Part 3: Key establishment," International Standard, First Edition, Dec. 1, 2002, 38 pages.

Menezes et al., "Handbook of Applied Cryptography," Jun. 1996, 794 pages.

RSA Laboratories, "PKCS #1 v2.1: RSA Cryptography Standard," Jun. 14, 2002, 61 pages.

* cited by examiner

PROTECTION OF A CALCULATION PERFORMED BY AN INTEGRATED CIRCUIT

BACKGROUND OF THE INVENTION

1. Field of the Invention

The present invention generally relates to electronic circuits and, more specifically, to integrated circuits comprising calculation elements (software and/or hardware) implementing algorithms performing several identical operations on a same element of a group in the mathematical meaning of the word. "Operation" is used to designate any law of composition of two elements in the group such that the result is an element in the group. The term "operation" and the expression "internal (composition) law" will be used interchangeably hereafter.

An example of application of the present invention relates to exponentiations especially performed in cryptographic calculations, for example of a so-called RSA algorithm which is a public key algorithm based on a modular exponentiation calculation.

Another example of application of the present invention relates to operations performed on elliptic curves in cryptographic calculations, for example, of a so-called Diffie-Hellman algorithm which is a protocol for generating shared keys from an exchange of public keys.

The present invention more specifically relates to the protection of an iterative calculation against attacks by disturbance of the operation of the electronic circuit executing the calculation. Such attacks for example aim at discovering quantities intended to remain secret. The present invention more specifically relates to so-called fault-injection attacks.

An example of application of the present invention relates to smart cards and the like.

2. Discussion of the Related Art

Figure 1:
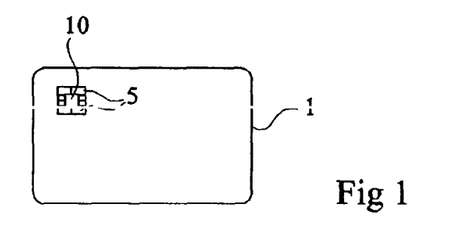
FIG. 1, previously described, very schematically shows an example of a smart card of the type to which the present invention applies as an example.

FIG. 1 very schematically shows a smart card 1 of the type to which the present invention applies as an example. Such a card is most often formed of a plastic support on or in which is placed an integrated circuit chip 10 associated with contacts 5 of communication with a terminal (not shown) and/or with ratio-frequency transmit/receive elements, not shown, for a contactless communication.

Another example of application of the present invention relates to microcomputers and more generally electronic boards (for example, a personal computer motherboard) comprising an integrated circuit performing calculations on a group, for example, for data transmission.

Figure 2:
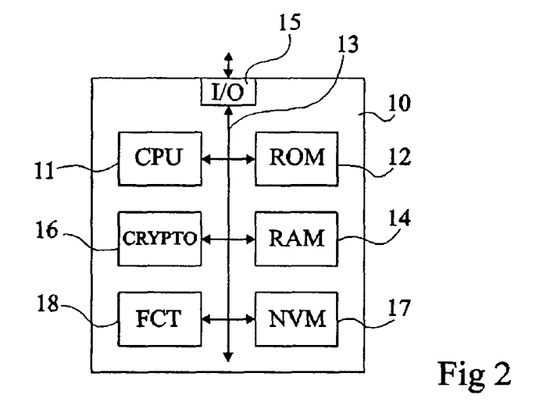
FIG. 2, previously described, is a schematic block diagram of a conventional example of a microcontroller provided with a hardware cryptographic calculation cell of the type to which the present invention applies as an example.

FIG. 2 very schematically shows, in the form of blocks, a conventional example of electronic circuit 10, for example, of a smart card, to which the present invention more specifically applies. In this example, it is a microcontroller comprising a central processing unit 11 (CPU) capable of executing programs most often contained in a ROM 12 with which unit 11 communicates by means of one or several buses 13. Bus(es) 13 convey signals between the different circuit elements and especially between central processing unit 11 and one or several RAMs 14 intended to contain data being processed, and an interface 15 (I/O) for communicating with or without contact with the outside of circuit 10. In circuits to which the present invention applies, a ciphering or cryptography function 16 (CRYPTO) is most often implemented in hardware fashion in microcontroller 10 and executes at least one calculation, for example, of exponentiation. The microcontroller may also comprise a rewritable non-volatile memory area 17 (NVM) (for example, of EEPROM type or the like) and other functions (block 18, FCT) according to the application, for example, cyclic redundancy check (CRC) functions, functions of generation of digital quantities for a DES-type algorithm, etc.

The present invention also applies to simpler integrated circuits only having a cryptographic calculation unit and a memory area for storing at least one or several quantities intended to remain secret and defining the number of iterations of the operation.

Figure 3:
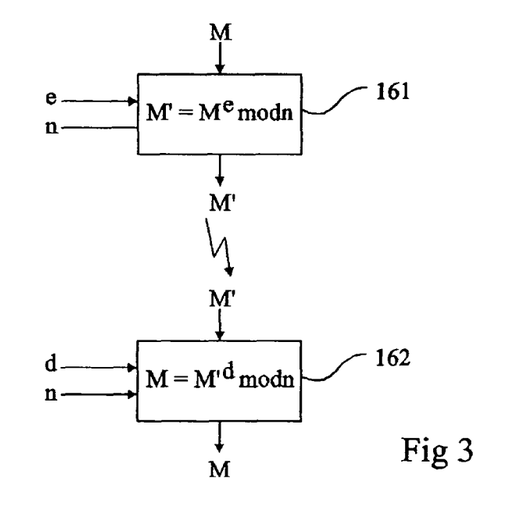
FIG. 3, previously described, is a schematic block diagram illustrating the execution of a ciphering/deciphering by an RSA algorithm to which the present invention applies as an example.

FIG. 3 very schematically illustrates in the form of blocks a conventional example of an RSA algorithm exploiting a modular exponentiation calculation. Such an algorithm is described, for example, in the "Handbook of Applied Cryptography" by A. Menezes, P. Van Oorschot, and S. Vanstone, published by CRC Press in 1997, and in RSA Cryptography Standard V2.1 (RSA Labs, Jun. 14, 2002), which is incorporated herein by reference.

A message M to be ciphered is sent to a ciphering cell 161 (for example, a dedicated portion of an integrated circuit) which also receives or contains an exponent e and a modulo n to be used in the calculation and which define the public key of the RSA algorithm. Block 161 executes calculation $M^e$ mod n and provides ciphered message M'.

On the deciphering side, a modular exponentiation cell 162 receives message M', as well as modulo n (public in the RSA case) and an exponent d here defining an element of the private key of the message receiver. The performed calculation is identical to that of the ciphering. Cell 162 executes operation $M'^d$ mod n to provide message M plain. The possible relations that numbers e, d, and n should respect for the implementation of the RSA algorithm are of no importance for the discussion of the present invention. In practice, the same circuit may comprise a single cell 161 or 162 loaded with different parameters according to whether it ciphers or deciphers.

Due to the size of the handled numbers, the exponentiation is calculated by a so-called square-and-multiply technique which exploits the binary representation of the exponent (e or d) to break up the calculation into a succession of squarings and multiplications by a preceding intermediary result.

Figure 4:
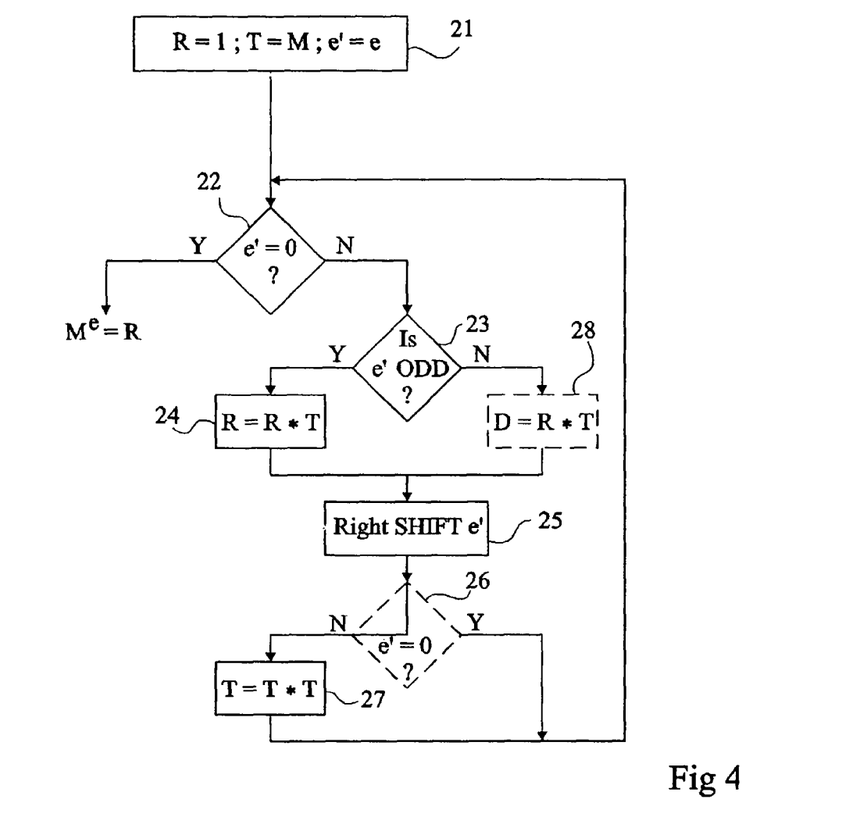
FIG. 4, previously described, is a flowchart of a conventional example of an exponentiation calculation by the square-and-multiply method.

FIG. 4 is a flowchart illustrating an exponentiation calculation by a conventional square-and-multiply technique. The calculation, shown in the form of a flowchart in FIG. 4, is in practice generally performed by a hardware cell (in wired logic) but may also be implemented by software means.

A first step (block 21, R=1; T=M; e'=e) comprises initializing a result variable R to one, a temporary variable T as containing message M, and an exponent variable e' to the value of exponent e. In the RSA case, all calculations are performed modulo n. Value n is thus also known or received by the cell for executing the exponentiation.

To simplify the discussion of the present invention, an exponentiation calculation will, for example, be taken with notations $M^e$ mod n, knowing that number M, exponent e, and modulo n may form all or part of any number (for example, M'), exponent (for example, d), and modulo, in relation or not with the RSA algorithm.

The square-and-multiply technique takes advantage of the binary expression of the exponent in a calculation by electronic or computer means. Variable e' will be considered hereafter as a succession of bits initially representing exponent e of the calculation.

The square-and-multiply technique is performed by iterations on variables and R, the number of iterations being equal to the number of (significant) bits of exponent e.

Before each iteration, the current value of variable e' is tested (block 22, e'=0?) to determine whether it still contains significant bits (at least another bit at 1). If variable e' is zero (output Y of test 22), result variable R provides result $M^e$ of the exponentiation. Otherwise (output N of block 22), the calculation enters a loop.

At each iteration of this loop, the even or odd character of the current value of variable e' is tested (block 23, Is e' ODD ?). If e' is odd (output Y of test 23), the content of variable R is multiplied by the content of variable T and the result becomes the current value of variable R (block 24, R=R*T). Otherwise (output N of block 23), variable R is not modified.

The content of variable e' is then shifted rightwards (block 25, Right SHIFT e'), which amounts to eliminating the least significant bit which has conditioned the even or odd character in the preceding test 23. In the example of a binary representation of the exponent, this amounts to dividing variable e' by 2 (in integer part). According to the hardware elements used to execute the algorithm, the step of rightward shifting of variable e' may be carried out by a shift register or be replaced with the successive taking into account of the different bits of exponent e.

The content of variable T is then squared (block 27, T=T*T), which amounts of performing another multiplication and the result becomes the current value of variable T. The iteration is over. The calculation then resumes with test 22 to restart an iteration if there remain unprocessed significant bits of the exponent.

Optionally, the current value (comprising one less representative bit) of variable e' is tested (block 26, e'=0 ? in dotted lines) prior to step 27 to check whether there remain significant bits. If so (output N of test 26), calculation 27 is performed. Otherwise (output Y of block 26), variable T is not modified. This option enables saving a calculation at the end of the algorithm.

A disadvantage of an exponentiation calculation such as described in relation with FIG. 4 is that it is vulnerable to attacks tending to discover the handled secret quantities.

A first type of attack is to monitor the calculation execution time which differs, at each iteration, according to the even or odd character of current exponent e'. Now, this even or odd character directly provides value 0 or 1 of the corresponding least significant bit.

A known solution to solve this execution time problem is to introduce (block 28, D=R*T), in case of a negative test 23 (least significant bit of variable e' equal to 0), an arbitrary calculation that is not needed for the result.

Such an unnecessary calculation is not necessary to compensate for calculation 27 in the presence of test 26, since the only iteration in which calculation 27 is not executed is the last one.

Even if it can be provided for the calculation to take the same time whatever the iteration, this calculation remains vulnerable to another category of attacks, called fault injection attacks. A fault injection attack comprises causing a disturbance in the integrated circuit operation in the calculation execution (for example, by means of a laser, of a disturbance on the power supply, etc.) and interpreting the subsequent circuit operation to attempt discovering the secret quantities (here exponent e).

In the case of a square-and-multiply calculation, by disturbing the multiplication operation (block 24 or block 28) in an iteration of the algorithm, a hacker is able to determine whether the least significant bit of the current value of the exponent (e') is 0 or 1. Indeed, if it is a 0, the final result provided by the calculation will be the same as with no disturbance, since the disturbance bears on the multiplication of block 28 while, if the bit is at 1, the final result will be modified since the disturbance bears on the multiplication of block 24. By repeating the fault injections at different times in successive executions of the same calculation, it is then possible for the hacker to deduce all or part of the key (the exponent), and thus, at least, to decrease the number of assumptions to be made about this key.

Figure 5:
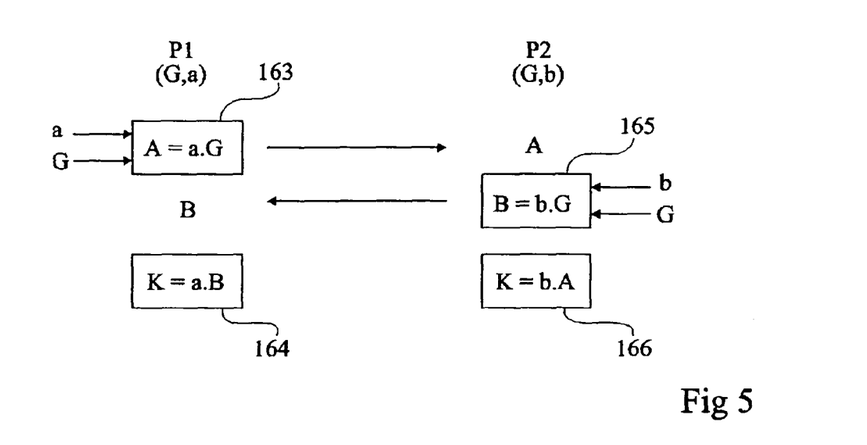
FIG. 5, previously described, is a schematic block diagram illustrating the execution of a Diffie-Hellman protocol on an elliptic curve to which the present invention applies as an example.

FIG. 5 very schematically illustrates in the form of blocks another example of application of the present invention to a Diffie-Hellman algorithm on an elliptic curve.

Such an algorithm is used to create a shared key K (for example, a session key) for a protected exchange between two systems or circuits P1 and P2. Each circuit holds a private key, respectively a or b, and an element G of an elliptic curve defining, with an internal composition law arbitrarily called "addition", noted "(+)", an abelian group on which the calculation is performed. Element G is known and needs no protection. Private keys a and b are integers expressing the number of times that the group composition law is applied.

A property of an elliptic curve thus is that, starting from a point in the curve, the application, an integral number of times, of the composition law called addition provides a result still located on the curve. Sometimes, it is spoken of as a "product", noted ".", to designate the number of times that the composition law is applied.

Elliptic curves are used in cryptography for the asymmetrical character of the iterative calculation, that is, knowing a point in the curve, it is easy to obtain another point in the curve by applying the composition law an integral number of times but, knowing two points in the curve, it is difficult to find the integer (the key) connecting these two points.

Examples of application of elliptic curves to cryptography are described in standards: "Standards for Efficient cryptography, sec 1: Elliptic Curve Cryptography"—Certicom Research—Sep. 20, 2000, Version 1.0c; "DSA on Elliptic Curves: ECDSA"—ISO/IEC 15946-2; and "Diffie-Hellman on Elliptic Curves: ECDH"—ISO/IEC 15946-3, which references are incorporated herein by reference.

Each circuit P1, P2 calculates a public key, respectively A, B as being the result of the "product" of its private key a or b with element G (block 163, A=a.G and block 165, B=b.G). Then, each circuit sends its public key to the other. Finally, each circuit P1, P2 calculates a key K as being the "product" of its private key a or b by the public key, respectively B or A, of the other circuit (block 164, K=a.B, block 166, K=b.A). Due to the properties of the internal composition law of the group, keys K are identical (K=a.b.G=b.a.G). Key K can thus be used as a secret key shared by the two circuits. It can then be used as a ciphering (for example, by a symmetrical algorithm), authentication, etc. key between circuits P1 and P2.

As for an exponentiation, due to the size of the handled numbers, the successive applications of the internal composition law from a point of an elliptic curve are calculated by a so-called add and double technique which exploits the binary (polynomial) representation of the integer (a or b) to break up the calculation into a succession of doublings (application of the composition law to a point on itself) and additions (application of the composition law to a preceding intermediary result).

Figure 6:
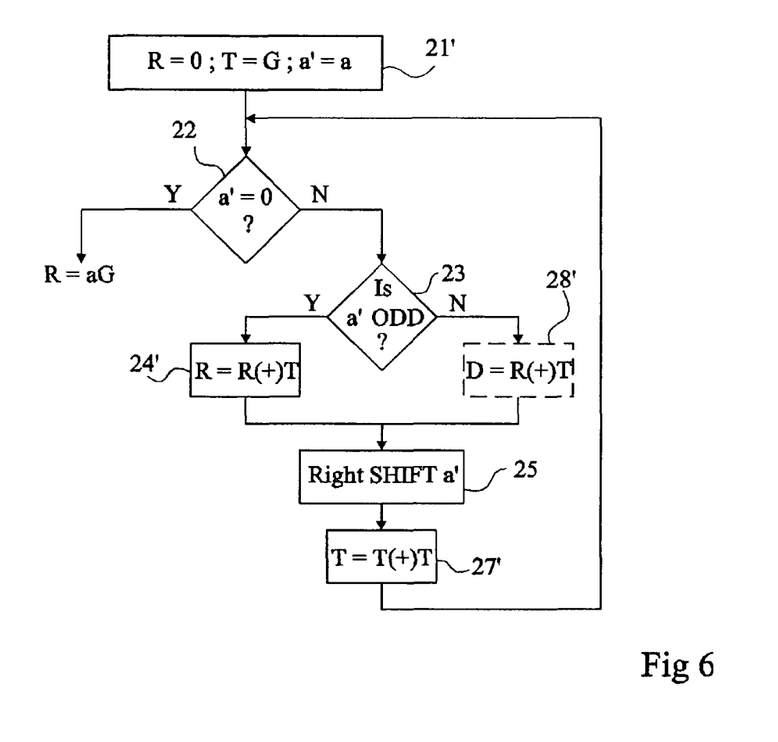
FIG. 6, previously described, is a flowchart of a conventional example of calculation by the add and double method.

FIG. 6 is a flowchart illustrating the add and double technique, for example, applied to a point G of an elliptic curve. As for FIG. 4, the calculation shown as a flowchart in FIG. 6 is in practice generally performed by a hardware cell (in wire logic) but may also be implemented in software fashion.

The add and double technique exploits the same characteristic of the binary expression of the integer as that exploited for the exponent in the modular exponentiation. Indeed, product a.G can be written as G(+)G(+) . . . (+)G (a times). Representing a in binary fashion over t bits, this product can also be written as $a_t 2^t G(+) a_{t-1} 2^{t-1} G(+) \ldots (+) a_1 2^1 G(+) a_0 2^0 G$, where coefficient $a_i$ of the term of degree i (i ranging between 0 and t) corresponds to the bit (value 0 or 1) of weight i of the binary expression of number a.

The add and double calculation is then performed by iterations on variables T and R, respectively representing a temporary variable and the result variable, the number of iterations being equal to number t of (significant) bits of number a. The calculation of FIG. 6 is identical to that of FIG. 4, by:

initializing (block 21', R=0; T=G; a'=a) variables R, T, and a', respectively with values 0 designating the neutral element of the internal composition law (here, the addition) on the group (here, the elliptic curve), G designating the group element (here, a point of the elliptic curve) and a in the form of a sequence of coefficients of a polynomial (here, a bit sequence), the significant degree of which designates the number of iterations;

replacing the multiplications * of blocks 24 and 27 (and, if existing, that of block 28) with the (+) composition law (block 24', R=R(+)T, block 27', T=T(+)T and block 28', D=R(+)T); and applying steps 22, 23, and 25 to variable a'.

The algorithm of FIG. 6 exhibits the same disadvantages of vulnerability to attacks, especially by fault injections, as the square-and-multiply algorithm.

More generally, similar problems may be posed for any calculation, by an electronic circuit, of an integral number of applications of an internal composition law on elements of an abelian group, by successive iterations of different steps according to the even or odd character of a current coefficient of a polynomial representation of said integer, the degree of which determines the number of iterations.

In the case of the exponentiation, the exponent is the integer and the composition law or internal operation of the abelian group is multiplication.

SUMMARY OF THE INVENTION

The present invention aims at overcoming all or part of the disadvantages of known algorithms of calculation by successive iterations on a group executed by an electronic circuit.

The present invention more specifically aims at providing a calculation mode which is resistant to possible attacks, especially, by injection of faults into the electronic circuit executing the calculation.

The present invention also aims at a solution which does not adversely affect the rapidity of execution of the calculations.

According to an object, the present invention more specifically aims at exponentiations of a group element by the square-and-multiply method.

According to another object, the present invention more specifically aims at calculations by application of the add and double method.

To achieve all or part of these objects, as well as others, the present invention provides a method of calculation, by an electronic circuit, of a result of an integral number of applications of an internal composition law on elements of an abelian group, by successive iterations of different steps according to the even or odd character of a current coefficient of a polynomial representation of said integer, the degree of which determines the number of iterations, each iteration comprising, whatever the even or odd character of the current coefficient, a step of updating of at least one variable conditioning the calculation result.

According to an embodiment of the present invention, if the coefficient of the current iteration is even, said composition law is applied with, as operands, a variable intended to contain the result at the end of the calculation and the neutral element of this law or, in case of a modular calculation, a value which is a function of the modulo such that the result is unchanged.

According to an embodiment of the present invention, a at least two temporary variables representing at least the content of a variable of a preceding iteration are exploited to shift in time an updating of a variable of the current iteration.

According to an embodiment of the present invention, the method executes, as long as all the significant coefficients of the polynomial representation of the integer have not been processed, the following operations:

if the current coefficient is even: T'=R(+)T;

otherwise, if the coefficient of the preceding iteration was even: R=PT(+)T', if it was odd: R=R(+)T; and in all cases: PT=T, then T=T(+)T, where (+) designates said composition law, R is a variable initialized with the neutral element of the composition law to contain the final result, T is a first time variable initialized with the value of the element to be submitted to the calculation, and T' and PT are two other temporary variables among which at least PT is initialized with the neutral element of the composition law.

According to an embodiment of the present invention, the method executes as long as all the significant coefficients of the polynomial representation of the integer have not been processed, the following operations:

if the current coefficient is even: T=PT1 (+)PT2, otherwise R=R(+)T; and in all cases: PT1=T, PT2=T, then T=T(+)T, where (+) designates said composition law, R is a variable initialized with the neutral element of the composition law to contain the final result, T and PT2 are two temporary variables initialized with the value of the element to be submitted to the calculation, and PT1 is another temporary variable initialized with the neutral element of the composition law.

According to an embodiment of the present invention, said integer is represented in binary form.

The present invention also provides a method for protecting a number representing a number of applications of a composition law of an abelian group on elements of the group against a possible hacking.

According to an embodiment of the present invention, the method is applied to the calculation of an exponentiation, in which:

said element is a number;

said internal composition law is a multiplication operation; and said integer is the exponent.

The present invention also provides a ciphering or deciphering method according to the RSA algorithm.

According to an embodiment of the present invention, said element is a point of an elliptic curve.

According to an embodiment of the present invention, the variables are contained in registers of the electronic circuit.

The present invention also provides a calculation cell.

The present invention also provides an integrated circuit comprising a calculation cell.

The foregoing and other objects, features, and advantages of the present invention will be discussed in detail in the following non-limiting description of specific embodiments in connection with the accompanying drawings.

DETAILED DESCRIPTION

The same elements have been designated with the same reference numerals in the different drawings. For clarity, only those steps and elements which are useful to the understanding of the present invention have been shown in the drawings and will be described hereafter. In particular, the hardware elements (registers, operators, etc.) used to implement the present invention by means of an integrated circuit have not been described in detail, the present invention being compatible with the elements used to implement conventional algorithms.

The present invention will be described hereafter in relation with two examples of application, respectively: to an exponentiation calculation by the square-and-multiply method and to an iterative calculation by the add and double method. It should, however, be noted that it more generally applies to any calculation (arbitrarily noted "."), by an electronic circuit, of a result of an integral number of applications of an internal composition law (arbitrarily noted (+)) on elements of a group, provided that the calculation divides into several iterations of steps applying the composition law to variables representing elements of the group and that the steps are different according to the even or odd character of a current coefficient of a polynomial representation of the integer, the significant degree of which determines the number of iterations.

Figure 7:
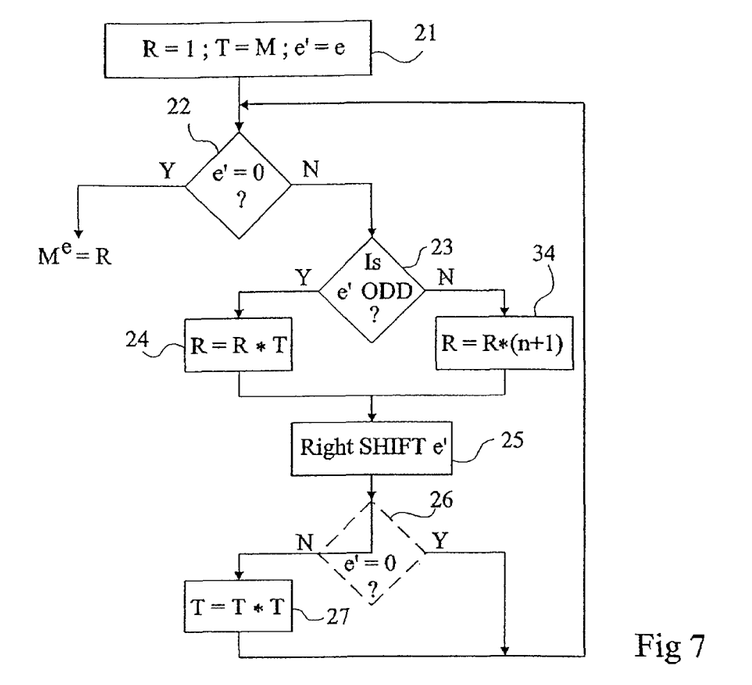
FIG. 7 is a flowchart illustrating a first embodiment of the present invention applied to an exponentiation calculation.

FIG. 7 is a flowchart illustrating a first embodiment of the present invention, applied to an exponentiation calculation.

As previously, a first step (block 21, R=1; T=M; e'=e) comprises the initialization of a result variable R to unity (neutral element of the composition law—here, the multiplication—of the group), of a temporary variable T with value M (group element) to be submitted to the exponentiation, and of an exponent variable e' with the coefficients of a polynomial (binary) representation of exponent e (integral number of times that the multiplication should be applied). In the case of a modular exponentiation, all the calculations which will be described are performed modulo n, the value of which is then known or received by the algorithm execution cell.

As previously still, the calculation is performed by iterations at least on variables T and R. The current value of variable e' is, before each iteration, tested (block 22, e'=0 ?) to determine whether it still contains significant bits (coefficients of the polynomial expression of the integer). If not (output Y of block 22), variable R contains result $M^e$ of the exponentiation. Otherwise, the even or odd character of variable e' (block 23, Is e' ODD ?) or value 0 or 1 of its least significant bit is tested. If e' is odd (least significant bit at 1), the content of variable R is multiplied (composition law or operation of the group) by the content of variable T (block 24, R=R*T) before shifting rightwards by one rank (block 25, Right SHIFT e') the bits of the current value of variable e' to eliminate the least significant bit (coefficient of the term of minimum degree of the polynomial expression of number e). The content of variable T is then multiplied by itself (block 27, T=T*T). The iteration is then over (return to the entrance of block 22).

As previously, a test (block 26, e'=0 ? in dotted lines) may optionally be provided on variable e' before step 27 to avoid the operation of this step at the last iteration (output Y of block 26).

According to an embodiment of the present invention, applied to a modular exponentiation, if variable e' is even, (output N of block 23), the content of variable R is submitted to a multiplication by n+1 (block 34, R=R*(n+1)), where n represents the value of the modulo of the modular exponentiation. Since all calculations are performed modulo n, a multiplication by value n+1 amounts, in a binary calculation, to not modifying the operand.

As a variation (especially in the case of a simple—non modular—exponentiation), the step of block 34 may be replaced with a multiplication of variable R by unity (the neutral element of the operation of the abelian group).

An advantage of this embodiment is that in case of a disturbance due to a fault injection attack, the result provided at the exit of the algorithm (output Y of block 22) will be modified by the disturbance of the calculation of block 24 or of block 34.

Further, this solution respects identical execution times whatever the current least significant bit of variable e'.

Figure 8:
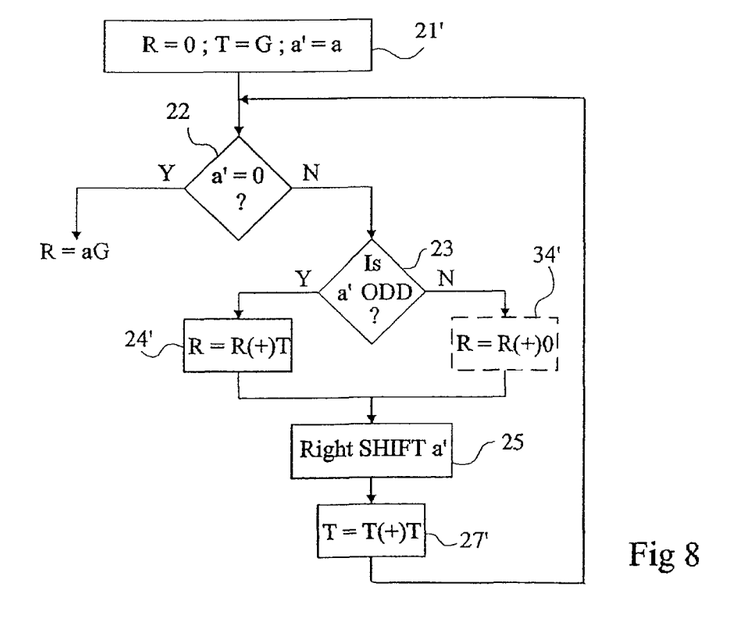
FIG. 8 is a flowchart illustrating the first embodiment of the present invention applied to an add and double calculation.

FIG. 8 is a flowchart illustrating the application of the first embodiment of the present invention to a calculation on an elliptic curve, by using an add and double method.

The calculation of FIG. 8 is similar to that of FIG. 7, by:

initializing (block 21', R=0; T=G; a'=a) variables R, T, and a', respectively with values 0 designating the neutral element of the composition law (here called addition (+)) on the group (here, the elliptic curve), G designating the group element (here, the point of the elliptic curve) and with a sequence of coefficients (here a bit sequence) of a polynomial representation of an integer a designating the number of times that the composition law should be applied;

replacing the multiplications of blocks 24, 27, and 34 with "additions" (block 24', R=R(+)T, block 27', T=T(+)T and block 34', R=R(+)0); and applying steps 22, 23, and 25 to variable a'.

In the example of FIG. 8, assuming a calculation modulo n, step 34' may be replaced with the addition of the modulo to intermediary result R, which does not modify its content. In FIG. 8, test 26 has been eliminated.

Figure 9:
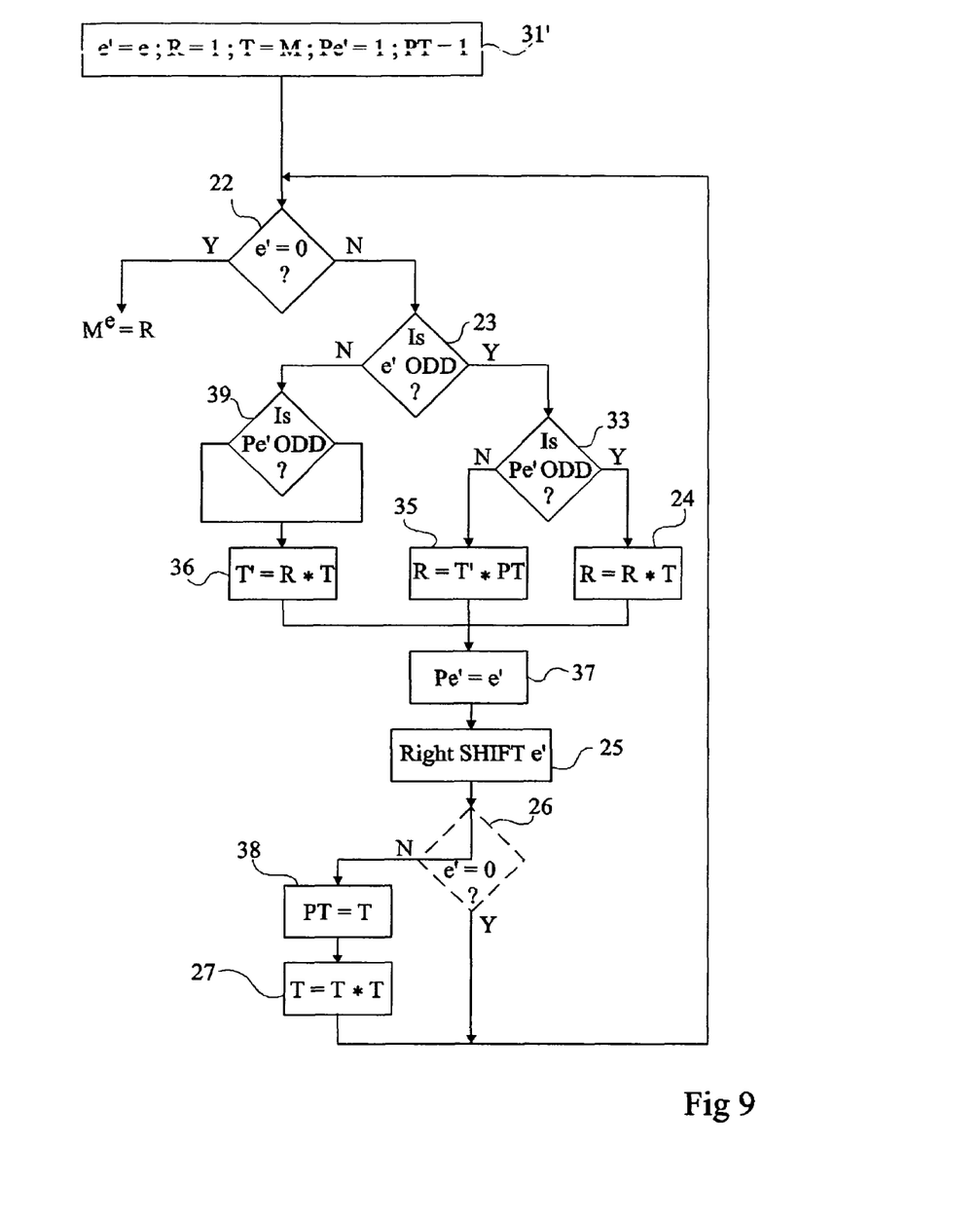
FIG. 9 is a flowchart illustrating a second embodiment of the present invention applied to an exponentiation calculation.

FIG. 9 is a flowchart illustrating a second embodiment of the method according to the present invention, applied to an exponentiation calculation.

As compared with the preceding embodiment (FIG. 7), at least two additional variables Pe' and PT are initialized to unity (block 31, e'=e; R=1; T=M; Pe'=1; PT=1) and a variable T' is not necessarily initialized (to any value). Variable Pe' contains the value of variable e' at the preceding iteration. Variable PT contains the value taken by variable T at the preceding iteration and variable T' contains a value taking part in the propagation of a possible error in case of an attack.

As long as there remain unprocessed significant bits of the exponent (test 22, e'=0 ?), the following operations are performed in a loop.

If the least significant bit of variable e' is even (output N of test 23), variable T' is updated with value R*T (block 36, T'=R*T). Otherwise (output Y of block 23), variable R is updated according to the value of the least significant bit of variable e' at the preceding iteration (block 33, Is Pe' ODD ?). If variable Pe' is odd (output Y of block 33), variable R takes value R*T (block 24). Otherwise (output N of block 33), it takes value T'*PT (block 35, R=T'*PT).

Steps 23, 24, 33, 35, and 36 amount to shifting to the next iteration the multiplication of the content of variable T with variable R. Accordingly, in the case of a fault injection, not only does the disturbance act on the result, but also is there no relation between the iteration which did not occur due to the disturbance and the current bit of the exponent. Further, the error in the result introduced by the countermeasure of the present invention propagates to the subsequent iterations.

Afterwards, variable Pe' is updated (block 37, Pe'=e') with the current value of variable e'. Then, variable e' undergoes the shifting by one bit to the right (block 25).

Variable PT is updated (block 38, PT=T). Then, variable T is updated with the result of multiplication T*T (block 27) before proceeding to the next iteration (return to the entrance of test 22).

As a variation, steps 38 and 22 are not performed at the last iteration (test 26 in dotted lines).

Preferably, to balance the execution time and the electric signature, a test (block 39, Is Pe' ODD ?) identical to test 33 is performed even in the case of an even least significant bit. Operation 36 is then performed whatever the result of test 39.

An advantage of the embodiment of FIG. 9 is that it both solves the problem of respect of the calculation execution time and improves the masking against possible fault injections.

This embodiment can also be applied to the add and double method by replacing the multiplications (blocks 24, 27, 35, and 36) with additions and by initializing variables PT and Pe' with the neutral element of the addition (more generally of the used composition law).

Figure 10:
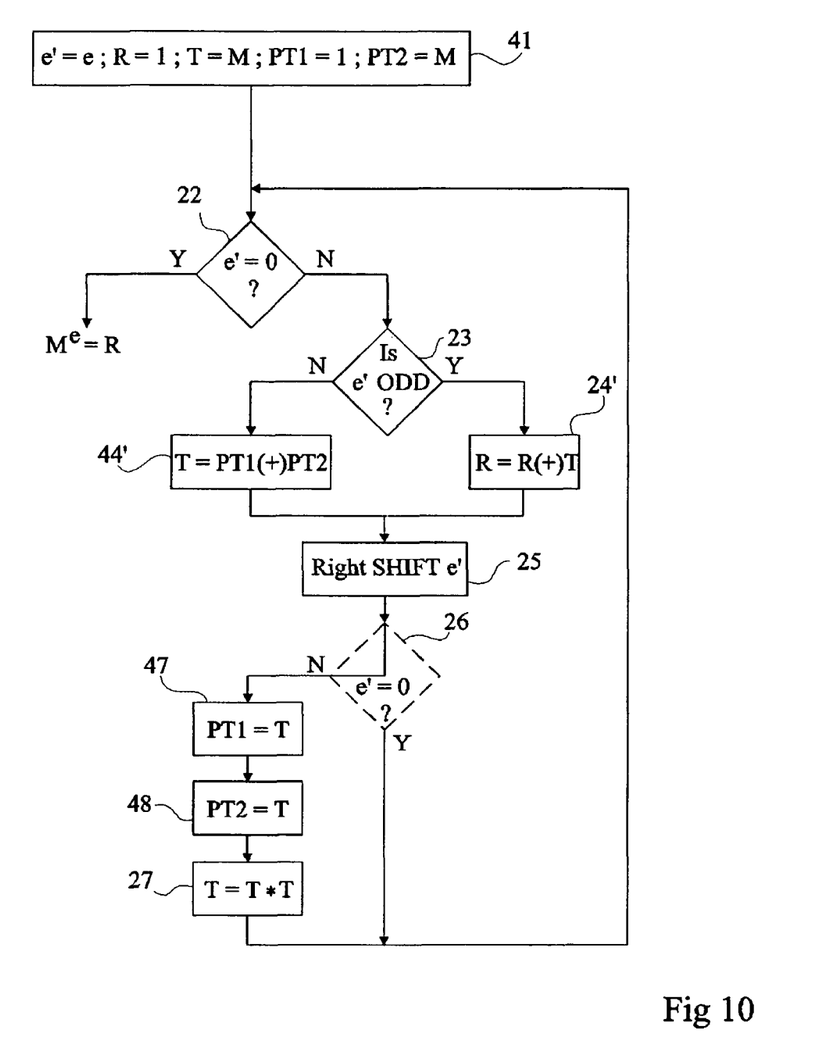
FIG. 10 is a flowchart illustrating a third embodiment of the present invention applied to an exponentiation calculation.

FIG. 10 is a flowchart illustrating a third preferred embodiment of the present invention, applied to the square-and-multiply method.

The difference with the embodiment of FIG. 9 is to intervene on variable T rather than on result variable R. Thus, two temporary variables PT1 and PT2 are initialized, respectively with value 1 and with value M (block 41, e'=e; R=1; T=M; PT1=1; PT2=M). The two variables PT1 and PT2 both contain, afterwards, the value of variable T of the preceding iteration. Test 23 on the even or odd character of current variable e' results, if e' is odd, in calculation 24 for updating variable R with the result of multiplication R*T. Otherwise, variable T is updated (block 44, T=PT1*PT2) with the result of the multiplication of the two variables PT1 and PT2. After the rightwards shift (block 25) of exponent variable e', variables PT1 and PT2 are updated (blocks 47, PT1=T and 48 PT2=T) with the current value of variable T, before updating of this variable T by its squaring (block 27).

An advantage of this embodiment is that is spares the taking into account of a variable (T') with respect to the previous embodiment. Another advantage is that it improves the masking of the calculation. In particular, if several bits are at zero in exponent e, then the embodiment of FIG. 9 only masks the consecutive least significant bits (if several consecutive bits are at 0, only the leftmost one in the word will be masked).

Figure 11:
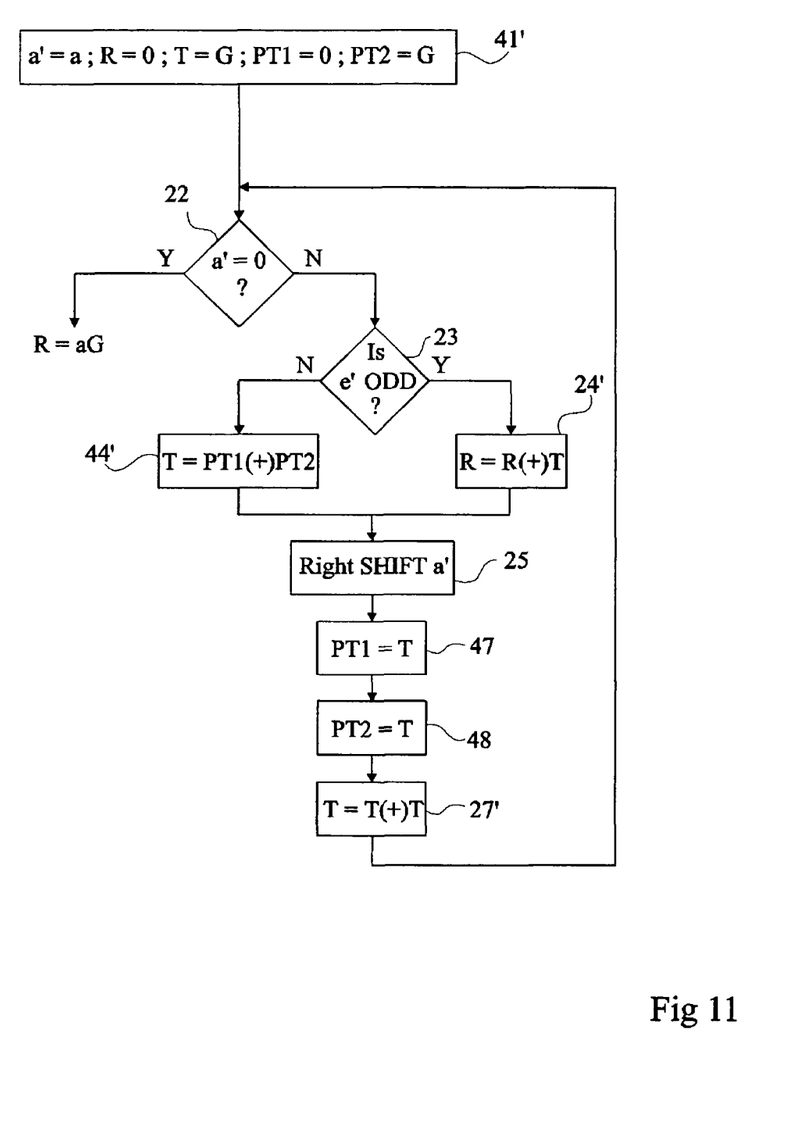
FIG. 11 is a flowchart illustrating the third embodiment of the present invention applied to an add and double calculation.

FIG. 11 is a flowchart illustrating the application of the third embodiment of the present invention to the add and double method.

The calculation of FIG. 11 is similar to that of FIG. 10 by:
  initializing (block 41', a'=a; R=0; T=G; PT1=0; PT2=G) variables a', R, T, PT1, and PT2, respectively with values a, 0, G, 0, and G;
  replacing the multiplications of blocks 24, 27, and 44 with additions (block 24', R=R(+)T; block 27', T=T(+)T; and block 44', T=PT1 (+)PT2; and
  applying steps 22, 23, and 25 to variable a'.

In the example of FIG. 11, test 26 has been suppressed.

Of course, the present invention is likely to have various alterations, improvements, and modifications which will readily occur to those skilled in the art. In particular, the present invention applies whatever the size of the handled numbers.

Further, the practical implementation of the present invention based on the functional indications given hereabove is within the abilities of those skilled in the art by using available hardware and/or software tools. In particular, a hardware implementation based on registers or other storage circuits, various operators, bit state comparators, etc. may use available elements.

Moreover, the transposition of the embodiments of the present invention to other composition laws on other groups is within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:
1. A method, comprising:
  calculating, by an electronic circuit, a result of an integral number of applications of an internal composition law to elements of an abelian group and protecting the electronic circuit from attack during the calculating, by:
  performing iterations of the calculation with different operations based on an even or odd current coefficient of a polynomial representation of said integral number, the degree of which determines the number of iterations;
  for each iteration having an odd current coefficient, updating a first variable that contains, after all iterations, a final result of the calculation; and
  for each iteration having an even current coefficient, performing on a second variable an operation that does not modify the value of the second variable, to produce an intermediate result of the iteration, the intermediate result of the iteration being used in the final result of the calculation, wherein a fault injection attack causes the final result of the calculation to be modified independent of whether the current coefficient is even or odd.

2. The method of claim 1 wherein said integer is represented in binary form.

3. The method of claim 1 wherein the protecting the electronic circuit during execution of the iterations comprises protecting a number representing a number of applications of a composition law of an abelian group on elements of the group against a possible hacking.

4. The method of claim 1, applied to the calculation of an exponentiation, wherein:
said element is a number;
said internal composition law is a multiplication operation; and
said integral number is the exponent.

5. The method of claim 4, comprising:
ciphering or deciphering according to an RSA algorithm.

6. The method of claim 1 wherein said element is a point of an elliptic curve.

7. The method of claim 1 wherein the variables are contained in registers of the electronic circuit.

8. The method of claim 1 wherein the second variable is the same as the first variable.

9. The method of claim 1, wherein, for each iteration having an even current coefficient, the composition law is applied to a variable that contains, after all iterations, the final result of the calculation and a neutral element of the composition law, or in the case of a modular calculation, a value which is a function of a modulo such that the result is unchanged.

10. The method of claim 1, wherein at least two temporary variables representing the value of at least one variable of a preceding iteration are utilized to shift in time an updating of a variable of the current iteration.

11. The method of claim 10, wherein performing iterations includes:
if the current coefficient is even: T'=R(+)T;
otherwise, if the coefficient of the preceding iteration was even: R=PT(+)T', if it was odd: R=R(+)T; and
in all cases: PT=T, then T=T(+)T,
where (+) designates said composition law, R is a variable initialized with a neutral element of the composition law to contain the final result, T is a first time variable initialized with the value of the element to be submitted to the calculation, and T' and PT are two other temporary variables among which at least PT is initialized with the neutral element of the composition law.

12. The method of claim 10, wherein performing iterations includes:
if the current coefficient is even: T=PT1(+)PT2, otherwise R=R(+)T; and
in all cases: PT1=T, PT2=T, then T=T(+)T,
where (+) designates said composition law, R is a variable initialized with a neutral element of the composition law to contain the final result, T and PT2 are two temporary variables initialized with the value of the element to be submitted to the calculation, and PT1 is another temporary variable initialized with the neutral element of the composition law.

13. An apparatus, comprising:
one or more memories; and
cryptographic circuitry coupled to the one or more memories, wherein the cryptographic circuitry, in operation,
calculates a result of an integral number of applications of an internal composition law on elements of an abelian group, by successive iterations of different steps according to an even or odd character of a current coefficient of a polynomial representation of said integral number, the degree of which determines the number of iterations; and
secures the calculating during execution of the iterations by,
in case of an odd current coefficient in an iteration, updating a first variable that contains, after all iterations, a final result of the calculation; and
in case of an even current coefficient in an iteration, performing on a second variable an operation that does not modify the value of the second variable, to produce an intermediate result of the iteration, the intermediate result of the iteration being used in the final result of the calculation, wherein a fault injection attack causes the final result of the calculation to be modified independent of whether the current coefficient is even or odd.

14. The apparatus of claim 13 wherein the one or more memories include registers storing the variables and the cryptographic circuitry comprises wired logic.

15. The apparatus of claim 13 wherein, for each iteration having an even current coefficient, the composition law is applied to a variable that contains, after all iterations, the final result of the calculation and a neutral element of the composition law, or in the case of a modular calculation, a value which is a function of a modulo such that the result is unchanged.

16. The apparatus of claim 13 wherein at least two temporary variables representing the value of at least one variable of a preceding iteration are utilized to shift in time an updating of a variable of the current iteration.

* * * * *